March 14, 1961     R. A. FOUST     2,974,711
IRON WORKING MACHINES
Filed Oct. 14, 1957
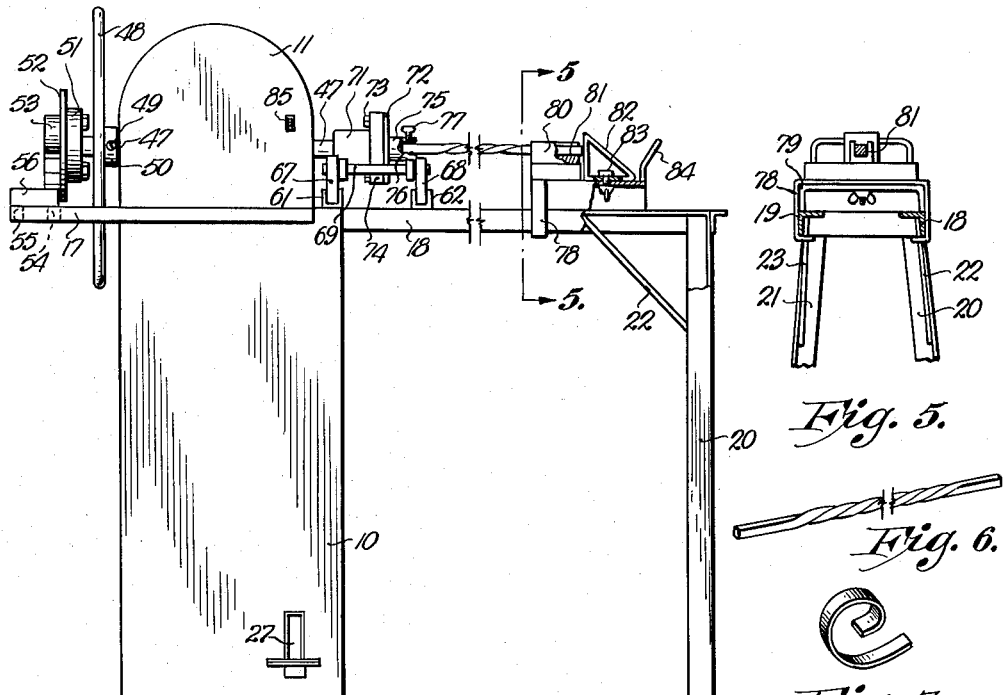
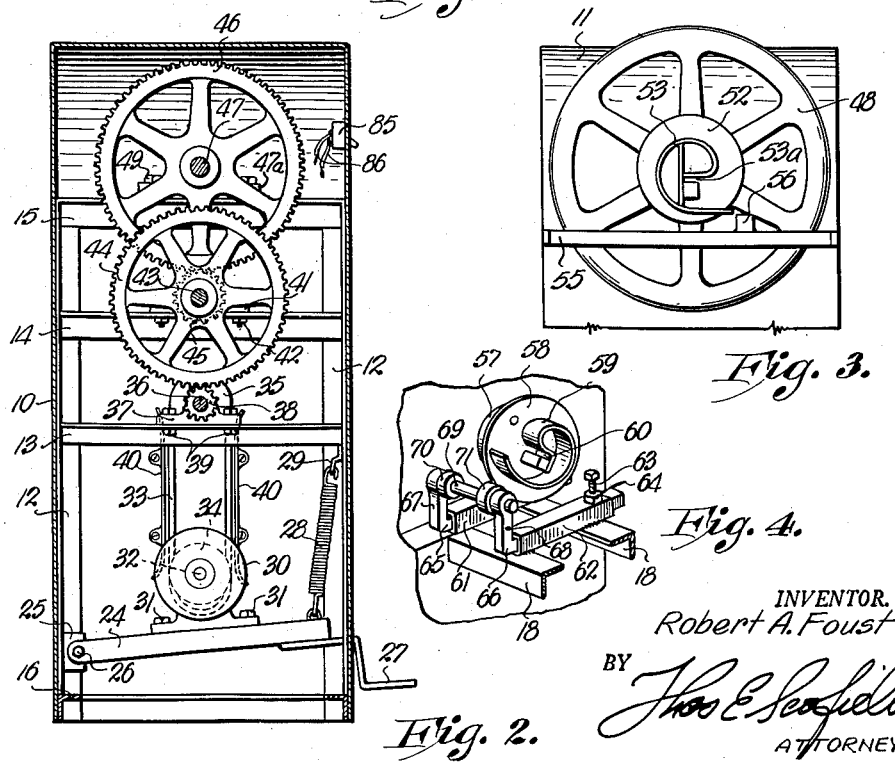
INVENTOR.
Robert A. Foust
BY
ATTORNEY.

United States Patent Office 2,974,711
Patented Mar. 14, 1961

2,974,711
IRON WORKING MACHINES
Robert A. Foust, 5208 Argentine, Kansas City, Kans.
Filed Oct. 14, 1957, Ser. No. 689,842
2 Claims. (Cl. 153—78)

This invention relates to apparatus for forming iron employed in decorative iron work and refers more particularly to such a device operable to both form iron bars into spirals and iron flats into curls of various forms and shapes.

A spiral, defined in the iron working trade, comprises an iron bar twisted axially so that at least a portion of its shaft forms a spiral shape. A curl, as defined in the iron working trade, comprises a flat piece of iron formed or deformed into a curl pattern. These basic design constructions in the iron working trade are employed as structural supports and decorative pieces in all sorts of decorative iron work, including railings, columns and the like. Very large numbers of both of these basic pieces are employed in decorative iron work. It therefore is of prime importance to be able to form them swiftly, cheaply and easily. These pieces must be formed uniformly, regular in shape and size and not deformed in such fashion as to cause difficulty in being fitted into a particular decorative iron work pattern. Many iron work pieces are made up of large numbers and groupings of these pieces attached one to the other, and the precision of fit required is quite exacting.

The iron working trade and industry has available, conventionally, a number of mechanical devices, mostly hand operated, to form these curls and spirals. However, the trade has not produced a power operated device to form both of these shapes, alternatively, with the speed, power, accuracy and convenience which is desired. Additionally, the variability of the forms and shapes which the conventionally available devices can provide is relatively limited, for example, the tightness of the curls which may be produced. The conventionally available devices often require a great expenditure of manual force on the part of the operator. Often the conventional forming devices require the presence of excess free space in the iron working shop for their operation, as the operator must walk around the iron working machine or device pushing or pulling the long or short piece of iron which is being formed. Few iron working shops are equipped to form spirals or, for that matter, desire to form spirals in view of the amount of effort required. Such shops conventionally buy the spirals already formed from their metal sources at a premium price. The preparation of such preformed spirals to employ them in step rails invariably causes difficulty in cutting or shearing the ends to fit the angle of the rails, as the spiral centrally of the rod prevents easy alignment of the rod end faces in the shearing operation.

Therefore, an object of the invention is to provide an iron working machine which will form either curls or spirals with or without changing jigs on the machine.

Another object of the invention is to provide an iron working machine which will form spirals or curls with great accuracy, high speed, and extreme ease.

Another object of the invention is to provide an iron working device which will form both spirals and curls from iron rods and flats wherein no backing means or reversible power source is required to release the formed pieces from the forming jigs.

Another object of the invention is to provide a device for forming curls and spirals from iron rods and flats which has an extremely long life, is rugged, simple, easy to repair and wherein all of the parts are readily accessible for replacement or repair, the device itself relatively cheap and easy to manufacture.

Another object of the invention is to provide an iron working machine which forms spirals from iron rods with uniform nonspiraled end sections.

Another object of the invention is to provide an iron working device which forms curls and spirals from flats and rods wherein the curls may be formed of variable radii and extremely heavy stock may be formed into curls and spirals without difficulty, if desired.

Another object of the invention is to provide an iron working device which will form curls of tighter radius and shorter length than is formable conventionally with conventional iron working devices.

Another object of the invention is to provide an iron working device for forming spirals and curls from flats and rods wherein the device is self cleaning and does not accumulate iron powder or dust in such manner as to clog the device or require frequent cleaning thereof.

Still another object of the invention is to provide a device for working iron which will form short curls continuously without the necessity of stopping the device to release the formed curls from the machine.

Yet another object of the invention is to provide a device for working iron which is able to form spirals with double spiraled sections and central nontwisted sections.

Another object of the invention is to provide an iron working device which will form spirals and curls from extremely long flats and rods without requiring excess space in the iron working shop or walking around the forming device by the operator.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Fig. 1 is a front view with parts broken away of the inventive iron working device.

Fig. 2 is a side-sectional view through the housing of the device shown in Fig. 1 to illustrate the drive mechanism therefor.

Fig. 3 is a left-end view of the device of Fig. 1 showing the hand wheel and curl forming jig mounted on the drive shaft.

Fig. 4 is a view of the right-hand side of the housing with a curl forming jig mounted on the main drive shaft.

Fig. 5 is a view taken along the lines 5—5 of Fig. 1 in the direction of the arrows.

Fig. 6 is a showing of a typical formed spiral.

Fig. 7 is a showing of a typical formed curl.

Referring to the drawings, at 10 is shown a housing having an upper hood portion 11. A plurality of vertical members 12 are positioned opposite one another at the corners of the housing and have horizontal members 13, 14 and 15 (Fig. 2) fixedly attached or welded thereto. The vertical members 12 are also connected by lower cross members 16 as well as upper outer cross members 17 (Fig. 1). Laterally extending angle frame members 18 and 19 (Fig. 5) are fixed at their inner ends to the housing and at their outer ends to legs 20 and 21. Braces 22 and 23 between the horizontal members and legs are optional, but preferred.

Referring to Fig. 2, platform 24 is pivotally mounted on bracket 25 fixed to the housing wall 10 by pin 26 and has foot treadle 27 attached to the free end thereof. Resilient coil spring 28 is fixed at one end to the platform 24 and at the other end to engagement 29 fixed to the housing wall 10. Power source 30, such as a conventional electric motor, is fixed to the platform 24 by bolts 31. Motor 30 drives shaft 32. Belt 33 is engageable with pulley 34 on the shaft 32 at its lower end and with opposing sheave 35 mounted on shaft 36 received in bearing 37 mounted on arms 13. Relatively small diameter gear 38 is also mounted on shaft 36, the bearing 37 being fixed to arms 13 by bolts 39. Belt guides 40 are fixed to the wall 10 of the housing.

Bearing 41 is fixed to angle pieces 14 by bolts 42 and mounts shaft 43 having enlarged gear 44 on one end thereof engageable with small gear 38 and relatively small gear 45. Gear 45 is engageable with enlarged gear 46 received on shaft 47 carried by bearing 47a mounted by bolts 49 on angle pieces 15. The ultimate purpose of this linkage is to provide a drive from the power shaft 32 of the motor 30 to secondary shaft 47 which drives the jigs for the iron working process. Depression of foot treadle 27 tightens belt 33 to cause the shaft 32 to drive shaft 36, which, in turn, drives shaft 43 which drives shaft 47. The linkages reduce speed and gain power.

Shaft 47 extends outwardly through both sides of the hood 11. Referring to Fig. 1 and the left-hand side of the hood 11 in that view, hand wheel 48 is rigidly seized on shaft 47 by set screw 49 through collar 50 which is integral with or fixedly attached to the hand wheel 48. An iron working jig for forming curls from iron flats is fixed on the end of the shaft 47 and comprises collar 51, plate 52, and forming spiral 53 with receiving groove 53a. The jig is removable from shaft 47 to replace it with another having a forming spiral of either lesser or greater radius. The jig is fixed to the shaft 47, however, when mounted thereon whereby to rotate therewith. Cross pieces 54 and 55 extend between the arms 17 on either side of housing 10 and supporting bearing block 56 thereon for abutment with iron flats as they are formed to a curl on the rotating jig spiral 53. The stop or bearing bar 56 may be made adjustable on the cross arms 54 and 55 but is not shown thus in Figs. 1 and 3, contemplating the general practice use of a standard sized, high frequency use curl jig on the left end of the shaft 47.

Referring to the right-hand end of shaft 47 in the view of Fig. 1, jigs for either forming curls from flats or spirals from iron bars may be mounted thereon. Fig. 1 shows the latter alternative, while Fig. 4 shows the former alternative. Fig. 4 will be first described. Therein is shown a jig similar to that shown in Fig. 3, having a collar 57 fixable on the end of the shaft 47, a plate 58 fixed to the collar and the forming spiral 59 having the central flat end receiving groove 60 for receiving the end of an iron flat piece to be formed into a curl. The forming spiral 59 is fixed to the face of the plate 58. A pair of rectangular, hollow slideways or channels 61 and 62 are fixed to the top edge of the housing 10 and on angle irons 18 and 19, respectively, by welding or other means. Set screws are provided extending through the upper surfaces of these enclosures, only one of which, 63, can be seen. Screw 63 has lock nut 64 thereon. Bars 65 and 66 extend through and are received in the channels 61 and 62, respectively, and have upwardly extending, shaft mounting arms 67 and 68 which mount shaft 69 rotatably therebetween. Stops 70 and 71 are rigidly fixed to shaft 69 and position it between the arms 67 and 68. Shaft 69 is thus adjustable laterally out of line of the axis of shaft 47 to permit the accommodation of various sized curl forming dies on the end of shaft 47.

Turning now to Figs. 1 and 5, wherein are shown the setup for twisting spirals from iron rods, at the right top in the view of Fig. 1, is shown the jig assembly for such operation. The jig mounted on shaft 47 comprises a collar 71 rigidly fixable to the shaft 47, with plate 72 fixed by bolts 73 to enlarged secondary collar 74. Jig fixture 75 having opening 76 (square in cross section to match the cross section of the bar to be formed into a spiral) extending into the end thereof is formed integral with or welded or otherwise fixedly attached to plate 72. Set screw 77 extends through the wall of the fixture 75 to permit fixing of an iron rod end in the recess 76. Slidably mounted on angle irons 18 and 19 are metal frame members 78 and 79 (Fig. 5) which are fixed one to the other and grip the angle irons 18 and 19 for longitudinal adjustment relative thereto. An open top block 80 having a square inside opening 81 (Fig. 5) formed therein is positioned axially in line with shaft 47 and recess 76 in jig fixture 75. This opening is so sized relative the opening 76 as to receive the other end of an iron rod (square in cross section) therein. Stop 82 is removably bolted by screw 83 to the metal piece 79. Hand grip 84 is operable to slide the entire assembly back and forth on the iron members 18 and 19.

In operation of the inventive iron working device, the forming of curls on the jigs of the left side of the view of Fig. 1 and Fig. 4 will be first described. To begin the operation of forming a curl, the end of a flat piece of iron is inserted in the slot numbered 60 in Fig. 4 or 53a in Fig. 3. The thickness of the stock employed determines the dimensions of the jig and each jig must be sized for a particular thickness of stock with some slight leeway allowable. The direction of rotation of the jigs to form the curls is counterclockwise in Fig. 4 and clockwise in Fig. 3 (these jigs being mounted on opposite sides of the housing 11). To actuate the power source, the switch 85 (Fig. 2) through which the power lines 86 from any suitable external power source (such as an electrical outlet) communicate with the motor 30, is turned on. This commences rotation of the shaft 32 of the motor. However, since the spring 28 maintains the platform 24 in elevated position, there is no drive applied through the speed reduction linkage to shaft 47. After the iron flat has been inserted in the grooves of the jigs, as previously described, the foot treadle 27 is depressed by the operator against the action of spring 28 to cause the pulley 34 on the shaft 32 of the motor to engage the belt 33 and thus drive shaft 36, shaft 43 and, ultimately, shaft 47 through the speed reduction linkage. The jigs, in the process of forming a curl, rotate slightly less than 360°. Referring to Fig. 4, as the jig rotates in counterclockwise direction, the portion of the iron bar or flat not received in the groove 60 abuts the rotatable shaft 69 and, thus, the flat is curled around the jig form 59 as the jig itself rotates.

If the flat is shorter, after the 360° turn is almost completed, than the distance from the end of the groove 60 circumferentially around the jig form 59 and out to the shaft 69, there is no necessity of stopping the jig as the end of the flat will pull off the shaft 69 after it has been curled around the jig form. When making an extremely short curl from an iron flat, therefore, a continuous rotation of the jig may be maintained with the operator removing the formed curls from the jig as they are formed and merely inserting another flat as the groove 60 comes around approaching juxtaposition with shaft 69. This requires some slight skill on the part of the operator and depends a good deal upon the speed of rotation of the jig on shaft 47. However, it is well within the skill of an operator of the device with some practice and does not involve any marked element of danger to him. Of course, the shaft 69 must be adjusted within the housings 61 and 62 far enough away from the free end of the jig form 59 to avoid blockage of the flat against the shaft 69.

Ordinarily, however, the curls formed will be of a total length greater than the distance around the jig and out to shaft 69. Therefore, it is necessary for the operator to stop the jig before the free end of the jig form 59 and 53 passes tangentially to the outer surface of rod 69 or the bar 56. If the end of the jig form does so it will bend the curl in an undesirable fashion or break it. Without applicant's inventive resilient connection between the power source and the speed reduction mechanism and the shaft 47, it would be necessary to carefully drive the jig form 49 to where the free end thereof was substantially tangentially in line with the rod 69 or block 56 and then back it off by a reversing mechanism to free the curl which would be pinned between the free end of the jig form and the rod 69 or bar 56.

However, by provision of the resilient linkage, the operator may free the curl from the jig and bar combination without any backing mechanism. This is accomplished by the operator observing when the free end of the jig forms 59 and 53 are approaching the tangential position and, when the free ends are approximately 45° or less displaced therefrom, the foot treadle is released so that positive drive applied to the shafts 36, 43 and 47 is stopped. The momentum of the heavy speed reduction train, as well as that of the jigs and the hand wheel 48, carry the curl forming jig to completion in the forming motion (the tangential position). At this point, the resistance of the iron flat being formed causes the jig and associated gear train to rebound as the end of the jig form 59 or 53 comes to the tangential position and abuts against the top surface of the flat. This rebound due to the freeing of the speed reduction train from the power source is sufficient to permit the free removal of the flat from the jig form without having to back off the mechanism. This is extremely important and saves a great deal of time on the part of the operator. Of course, the inertia of the gear train must be judged relative the strength of the flat to avoid bending the flat by stopping the power engagement too late. However, this is very easily learned by an operator and becomes second nature with him. The release of power from the speed reduction linkage will depend upon the velocity of the drive, the thickness of the stock employed, etc. However, these variables are not at all difficult to judge as the mass of the speed reduction linkage is a constant, once installed, and curl bar stocks are of a limited number of conventional thicknesses.

It should be noted that the particular speed reduction linkage is not crucial. Thus, a gear drive, as shown, is preferred for strength, long life, little variation over a long life of hard use, etc. However, a chain drive may be employed. Likewise, the number of linkages and their character is not crucial as they will depend upon the running speed of the power source and the desired speed of rotation of the shaft 47. Only a typical linkage is shown in the drawings. A direct drive could be taken from the pulley 34 to the shaft 47, if desired, but a relatively massive, high inertia drive linkage is desired, as the force required to overcome the resistance of the iron pieces being formed into curls or spirals is quite considerable.

Referring now to the apparatus and method of forming spirals as shown in the upper right-hand portion of the views of Fig. 1 and Fig. 5, the process involved is much the same, although employing jigs of a different form. A primary problem is the releasing of the formed spiral from the jigs after the rotation of the iron bar to form the spiral portion thereof. If a free wheeling clutch arrangement as disclosed here is not employed, it is necessary to have a reversing mechanism on the shaft 47 to free the iron bar from the jigs.

By inserting one end of an iron bar to be formed into a spiral in the opening 76, and the other in the well 81 in jig 80, the device is ready to operate. The iron bar is completely unformed as a spiral at this point. The hand wheel 48 may be employed to align the faces of recess 76 with those of well 81. The operator then actuates the switch 85 and steps down on treadle 27. This causes the shaft 47 to rotate under the impetus of drive shaft 32 of the power source. Conventionally, the bar or rod is turned twice, that is, 720°. This forms the conventional spiral pattern in the body of the bar or rod. However, again as in the case of the curl, the operator here releases the treadle 27 somewhat before the end of the 720° revolution, which permits the mass of the speed reduction system and associated equipment to carry the bar somewhat slightly past the 720° mark and, then, the system having been released by the operator, the torsion of the iron bar returns it to the precise 720° turn position with the faces of the bar in alignment. This operation may sound more difficult as a timing problem than it actually is. An experienced operator can easily judge the necessary release point for the rod so as to cause virtually perfect alignment of the end faces of the formed spiral when the jigs come to rest. As the rod, when it comes to rest, is still within the grip of the speed reduction system, manipulation of the hand wheel 48 readily frees the ends of the formed spiral for release from the jigs. The hand wheel may also be employed in the release of curls from the jigs after they have been formed, as well. This is the situation when the mechanism does not rebound sufficiently from the curl forming operation to permit ready freeing of the curl.

Double spiral rods of relatively great length may be formed by taking the stop 82 out, engaging one-half of the long rod between the jig openings 76 and 81, forming one-half of the rod into a spiral, then reversing the rod so the center portion is again engaged in the jig 80 with the nonturned end adjusted in the opening 76. The opposite end of the rod is then formed to a spiral.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. An iron working device comprising a frame, a power source mounted on said frame operable to drive a primary drive shaft, means resiliently and rotatably mounting said primary drive shaft on said frame, a secondary drive shaft, means mounting said secondary shaft rotatably on the frame in substantially horizontal position, an iron working jig fixed to said secondary drive shaft and rotatable therewith, a speed reduction linkage continuously directly connected to said second drive shaft, the means mounting the first drive shaft on the frame normally resiliently positioning said first drive shaft relative to said linkage and frame in a first upper position, a drive connection between said first drive shaft and said linkage which is inoperable when the first drive shaft is in said first upper position, foot-operated means connected to said resilient mounting means to permit movement of the mounting means and the first drive shaft to a second lower position wherein the drive connection is operable, the speed reduction linkage being of substantially greater total mass than that of the secondary drive shaft and the jig thereon.

2. An iron working device as in claim 1 wherein the power source is on a platform pivoted at one end on the frame, the other end of the platform is attached by a resilient coil spring to the frame, the drive connection comprises a resilient friction belt, and the foot-operated means to move the resilient mounting means from the first to the second position comprises a foot treadle fixed to the end of the platform to which the spring is connected.

(References on following page)

References Cited in the file of this patent

UNITED STATES PATENTS

| | | | |
|---|---|---|---|
| 150,107 | Tucker | Apr. 21, | 1874 |
| 243,435 | Duffey | June 28, | 1881 |
| 257,399 | Snell | May 2, | 1882 |
| 283,304 | Tucker | Aug. 14, | 1883 |
| 417,410 | Crichton | Dec. 17, | 1889 |
| 475,181 | Burton | May 17, | 1892 |
| 528,608 | Richter | Nov. 6, | 1894 |
| 581,328 | Borton | Apr. 27, | 1897 |
| 1,731,087 | Zatti | Oct. 8, | 1929 |
| 2,456,088 | Scircle | Dec. 14, | 1948 |
| 2,649,887 | Lehman | Aug. 25, | 1953 |
| 2,736,207 | Leifer | Feb. 28, | 1956 |
| 2,875,603 | Moore | Mar. 3, | 1959 |

FOREIGN PATENTS

| | | | |
|---|---|---|---|
| 273,769 | Great Britain | July 4, | 1927 |